United States Patent [19]
Byers et al.

[11] Patent Number: 5,471,597
[45] Date of Patent: Nov. 28, 1995

[54] SYSTEM AND METHOD FOR EXECUTING BRANCH INSTRUCTIONS WHEREIN BRANCH TARGET ADDRESSES ARE DYNAMICALLY SELECTABLE UNDER PROGRAMMER CONTROL FROM WRITABLE BRANCH ADDRESS TABLES

[75] Inventors: Larry L. Byers, Apple Valley; Joseba M. De Subijana, Minneapolis; Wayne A. Michaelson, Circle Pines, all of Minn.

[73] Assignee: Unisys Corporation, Blue Bell, Pa.

[21] Appl. No.: 352,299

[22] Filed: Dec. 8, 1994

Related U.S. Application Data

[63] Continuation of Ser. No. 173,545, Dec. 23, 1993, abandoned.

[51] Int. Cl.⁶ .................................................. G06F 9/26
[52] U.S. Cl. ................... 395/375; 395/775; 364/DIG. 1
[58] Field of Search ............................... 395/375, 775, 395/800, 425

[56] References Cited

U.S. PATENT DOCUMENTS

| | | | |
|---|---|---|---|
| 3,634,883 | 1/1972 | Kreidermacher | 395/375 |
| 3,786,434 | 1/1974 | Frye et al. | 395/375 |
| 4,124,893 | 11/1978 | Joyce et al. | 395/375 |
| 4,156,925 | 5/1979 | Tutt et al. | 395/775 |
| 4,240,139 | 12/1980 | Fukuda et al. | 395/400 |
| 4,394,735 | 7/1983 | Satoh et al. | 395/375 |
| 4,635,188 | 1/1987 | Williamson et al. | 395/375 |
| 4,691,277 | 9/1987 | Kronstadt | 395/400 |
| 4,754,393 | 6/1988 | Kitson et al. | 395/375 |
| 4,831,573 | 5/1989 | Norman | 364/716 |
| 4,864,535 | 9/1989 | Rogers et al. | 365/94 |
| 4,868,735 | 9/1989 | Moller et al. | 395/375 |
| 4,907,192 | 3/1990 | Kaneko | 395/375 |
| 4,984,151 | 1/1991 | Dujari | 395/775 |
| 5,032,983 | 7/1991 | Fu et al. | 395/375 |
| 5,144,551 | 9/1992 | Cepulis | 395/425 |
| 5,197,131 | 3/1993 | Mori | 395/375 |
| 5,197,137 | 3/1993 | Kimura | 395/375 |
| 5,203,006 | 4/1993 | Taniai | 395/800 |
| 5,210,833 | 5/1993 | Kaneko | 395/375 |
| 5,230,068 | 7/1993 | Van Dyke et al. | 395/375 |
| 5,235,686 | 8/1993 | Bosshart | 395/375 |
| 5,297,264 | 3/1994 | Kishi et al. | 395/375 |

*Primary Examiner*—Parshotam S. Lall
*Assistant Examiner*—Viet Vu
*Attorney, Agent, or Firm*—Steven P. Skabrat; Charles A. Johnson; Mark T. Starr

[57] ABSTRACT

A system and method for executing conditional branch instructions by a processor using dynamic branch address tables containing branch target addresses. The branch target addresses are selected by the result of a computation of fields in the branch instruction and an index generated during the execution of previous instructions. The relevant fields include the base address of a branch address table and a mask value. The contents, size, and location of the branch address tables in a random-access-memory local store may be changed during run-time by program control.

2 Claims, 11 Drawing Sheets

| FIG. 3A | FIG. 3B |
|---|---|
| FIG. 3C | FIG. 3D |

FIG. 3

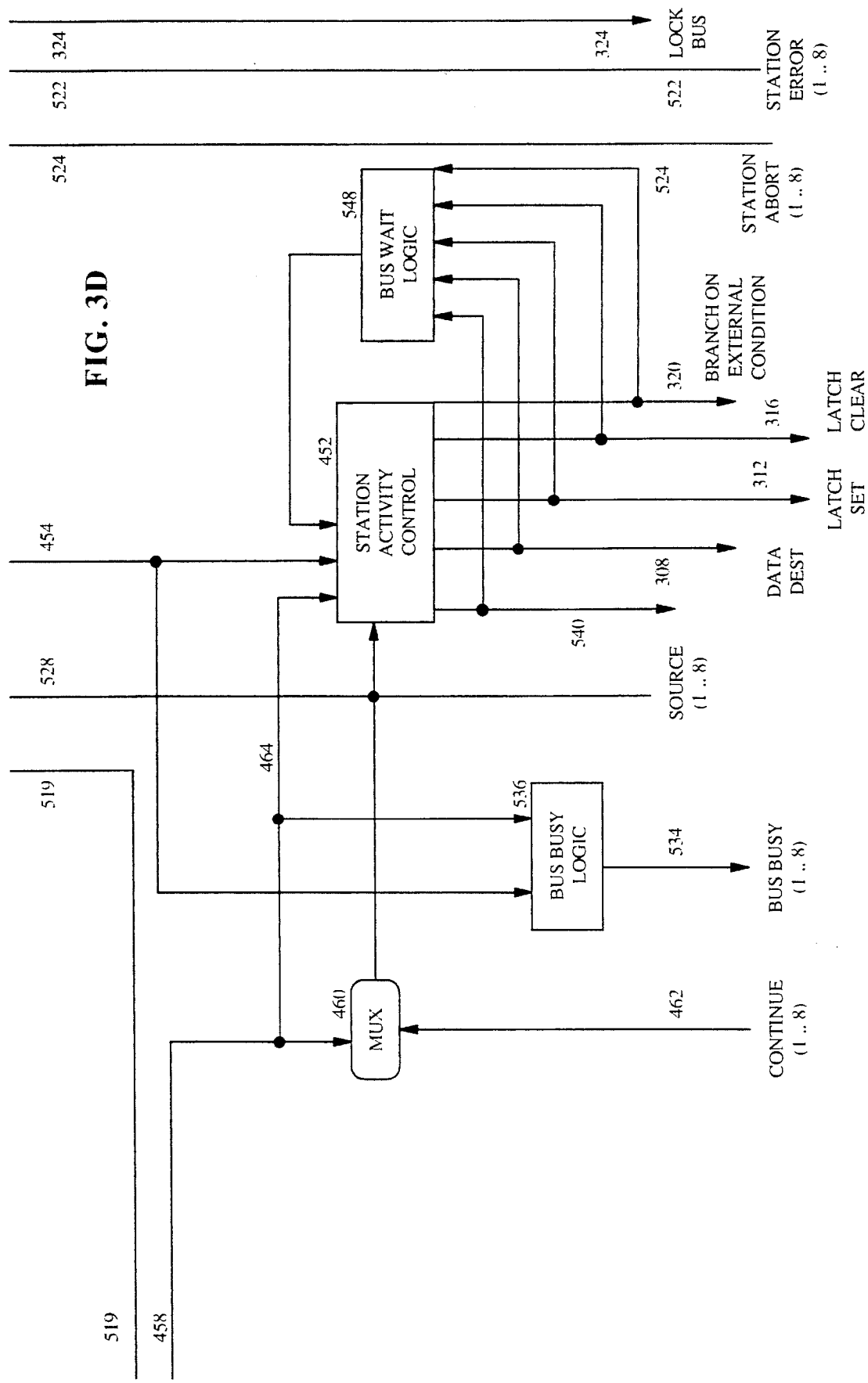

SYSTEM AND METHOD FOR EXECUTING BRANCH INSTRUCTIONS WHEREIN BRANCH TARGET ADDRESSES ARE DYNAMICALLY SELECTABLE UNDER PROGRAMMER CONTROL FROM WRITABLE BRANCH ADDRESS TABLES

This is a continuation of application Ser. No. 08/173,545 filed on Dec. 23, 1993 now abandoned.

CROSS REFERENCES TO RELATED APPLICATIONS

This application is related to the concurrently filed applications listed below, the disclosures of which are incorporated herein by reference. All of the listed applications are assigned to the same assignee as the present invention.

Microsequencer Bus Controller System, Ser. No. 08/172,657, invented by Larry L. Byers, Joseba M. De Subijana, and Wayne A. Michaelson.

System For Processing Shift, Mask, and Merge Operations In One Instruction, Ser. No. 08/172,526 invented by Larry L. Byers, Joseba M. De Subijana, and Wayne A. Michaelson.

BACKGROUND OF THE INVENTION

1. Field of the Invention

This invention relates generally to the processing of instructions in digital computer systems. More specifically, it relates to reduced instruction set computer (RISC) systems which use dynamic branch address tables to execute branch instructions.

2. Background Information

Control instructions are included in the instruction set architectures of processors to provide for the proper sequencing of instructions in a program, so that the programmed task can be performed correctly and efficiently. One important kind of control instruction is the branch instruction. The branch instruction changes the standard sequential order in which instructions in a program are executed. Branches may be conditional or unconditional. Conditional branches are taken when a specified condition has been satisfied, usually relating to the execution of the immediately preceding instruction. Unconditional branches are changes in program control that are always taken, without considering any conditions. When a processor executes a branch instruction, it typically transfers control to a branch target address referenced by the branch instruction. This branch target address is the address of an instruction to be executed rather than the next sequential instruction.

Most early branch instruction designs only allowed for the specification of branch target addresses that were within a set number of instructions from the current instruction. That is, the branch target address was really a relative offset, either forward or backward, from the current instruction. The size of the branch offset was bound by the number of bits allocated in the branch instruction word. To avoid this limitation, instructions known as "jumps" were used. A jump instruction changed the execution sequence of a program by setting the program counter to the specified address. This alleviated the problem of limited branch target addresses. However, it was necessary for the target address to be determined at the time the program was assembled.

This approach was not sufficiently flexible for some applications. Branch address tables were devised to provide more flexibility to the assembly language programmer in determining the desired target addresses for branch instructions. A branch address table contains a set of branch target addresses. These addresses are fixed at assembly time to point to blocks of instructions known as subroutines. Program control can be changed via one of the addresses in the branch address table by selecting an entry in the table during execution of the branch instruction. In this way, the number of possible branch target addresses is expanded.

A system using a branch address table is described in U.S. Pat. No. 5,203,006, issued to Taniai. This prior art system uses a fixed branch address table, loaded at assembly time, to reduce the number of instructions used in changing program control for a direct memory access controller. The limitations of this system include a limited number of addresses in the table, the use of only one table, the use of direct indexing into the table, and the inflexible nature of the implementation due to the use of programmable logic arrays. In addition, in the Taniai system all branch instructions must use the branch address table. No non-table branching was possible.

A branch instruction that avoids these limitations yet enlarges the number of possible branch target addresses in the branch address table and provides the capability of changing the contents of the branch address table during run-time is needed. Such an instruction would provide the maximum flexibility in selecting branch target addresses. Furthermore, a dynamic branching mechanism is needed that uses a table to change program control in only one instruction. A typical scheme using a "lookup" table to obtain the branch address takes at least four instructions after evaluation of the branch condition: a mask operation, a merge operation, a read of the table location, and a read of the entry in the table. A single comprehensive table branch instruction providing this functionality would increase processing throughput while saving space in for program storage.

SUMMARY OF THE INVENTION

An object of this invention is to enlarge the number of possible branch target addresses for a single branch instruction.

Another object of this invention is to perform a dynamic branch operation in only one instruction.

Yet another object of this invention is to perform branching of program control using a dynamic branch address table while minimizing the space used to store instructions for the program.

Still another object of this invention is to execute branch instructions in a program where the branch target address to transfer program control to may be selected from a dynamic table of branch addresses stored in random access memory (RAM) that is easily and quickly changed by the program.

Yet another object of this invention is to execute branch instructions in a program by a processor where the branch target address to transfer program control to may be selected from one of a set of variably sized dynamic branch address tables.

Still another object of this invention is to execute branch instructions in a program where the branch target address to transfer program control to may be selected by a merged index, specified by the program, into a dynamic branch address table.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

According to the present invention, the foregoing and other objects and advantages are attained by a processor architecture that implements a conditional branch instruction using a table of branch target addresses to obtain the address of where program control is to be transferred to if the branch is to be taken. This table may be updated, moved, or re-sized under program control.

In accordance with an aspect of this invention, the system, designed to execute branch instructions fetched from a control store, comprises one or more branch address tables, each of which includes branch target addresses pointing to instructions in the control store. Instruction decode logic is coupled to the control store, and determines if the instruction fetched from the control store is a branch instruction. It selects one of the branch address tables to reference, and loads the specified input parameters including a base address of the selected branch address table and a mask value. It also obtains an index into the selected branch address table relative to the base address. These input parameters are used to select one of the branch target addresses previously stored in the selected branch address table.

Local memory is provided to dynamically read and update the branch address tables. Temporary storage is used to hold the base address, mask value, and the table index. Arithmetic, logical, and shift logic is coupled to the instruction decode logic, local memory, and parameter storage, and performs arithmetic, logical, and shift operations on the base address, mask value, and table index to produce an indicator into the selected branch address table where a selected branch target address is stored. Finally, branch control logic is coupled to the arithmetic, logical, and shift logic, and the instruction decode logic, to conditionally select the instruction addressed by either the next sequential address or the selected branch target address as the next instruction to be fetched from the control store.

In accordance with another aspect of the invention, a method of transferring program control in a processor by executing a conditional branch instruction fetched from a read-only-memory control store addressed by a program counter, the processor having loaded a register with a table index during execution of the previous instruction comprises evaluating a branch condition. A selection is made as to whether or not a branch is to be taken, depending on the branch condition evaluation. The program counter is incremented to address the next sequential instruction when the branch is not to be taken. A first register is loaded with a base address of a branch address table containing branch target addresses when the branch is to be taken. Next, a second register is loaded with a mask value. The base address is merged with the table index according to the mask value to produce an address of an entry into the branch address table. The program counter is then loaded with the branch target address from the entry, thereby effecting a change in program control.

Still other objects and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 3, comprising FIG. 3(A) through FIG. 3(D), is a detailed diagram illustrating the architecture of a Microsequencer Bus Controller.

DESCRIPTION OF THE PREFERRED EMBODIMENT

I. Microsequencer Bus Controller System Architecture

The Microsequencer Bus Controller System provides the capability of flexible, microprocessor-based control of multiple gate arrays on a circuit card within a larger computer system. In the preferred embodiment, it is a part of a File Cache System commercially available from the assignee of the present invention. However, it may also be used in other computer systems where microprocessor control of multiple gate arrays is needed. It is a flexible solution to the problem of controlling function-specific VLSI gate arrays on one circuit card because one or more gate arrays can be changed without any other changes in the Microsequencer Bus Controller System hardware. When a gate array is changed, a corresponding change to the program the microprocessors execute may easily be made.

Figure 1:
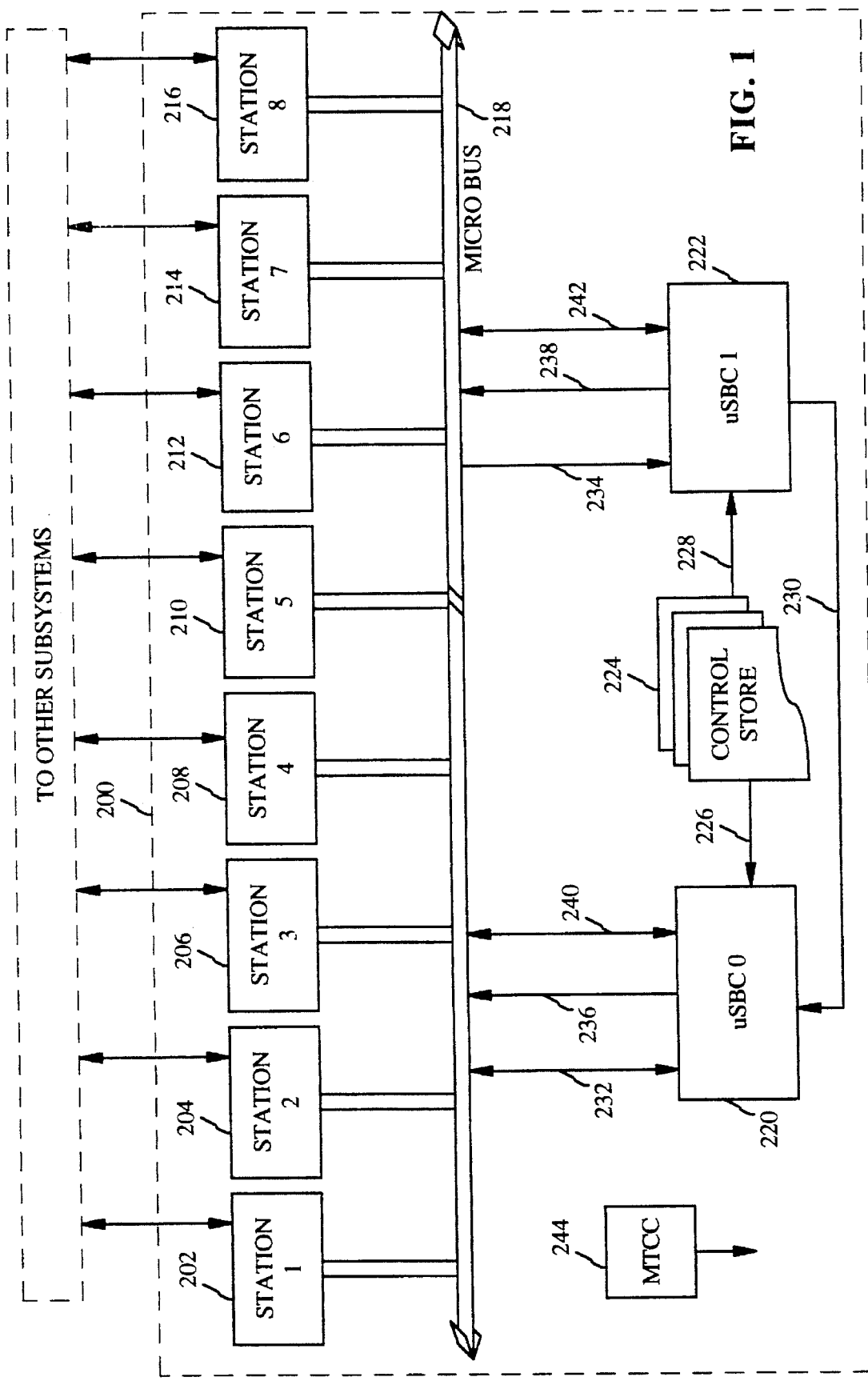
FIG. 1 is a block diagram of the Microsequencer Bus Controller System.

FIG. 1 is a block diagram of the Microsequencer Bus Controller System. The Microsequencer Bus Controller System 200 contains up to eight Stations 202, 204, 206, 208, 210, 212, 214, 216 connected to a bi-directional internal communication bus called the Micro Bus 218. A Station is a collection of logic implemented in a gate array on a VLSI part produced with Complementary Metal Oxide Semiconductor (CMOS) 448 technology that performs specific functions. A Station is coupled to the Micro Bus 218 and also may interface with another bus, I/O mechanism, or subsystem that is external to the Microsequencer Bus Controller System. That is, it may read data from or write data to other hardware components in the File Cache System. In the preferred embodiment, there are ten different gate array designs representing Stations in the File Cache System. However, it is possible that any custom designed gate array supporting a set of required functions can fulfill the role of a Station and be connected to the Micro Bus 218.

The Micro Sequencer Bus Controller (uSBC) 0 220 and uSBC 1 222 are special purpose RISC microprocessors that control the operation of the Stations via the Micro Bus 218. The uSBCs execute an instruction stream that is stored in the Control Store 224, a high speed static random access memory (SRAM). The instruction stream is written into the Control Store 224 at system initialization time. The instruction stream is fetched by uSBC 0 220 from the Control Store 224 over Line 226. The same instruction stream is fetched by uSBC 1 222 from the Control Store 224 over Line 228. The first microprocessor, uSBC 0 220, is the master, and the second microprocessor, uSBC 1 222, is the slave. The master and slave execute the same instructions at the same time but only the master microprocessor writes data on the Micro Bus 218. Results of operations performed by the slave microprocessor uSBC 1 222 are forwarded over Line 230 to the master microprocessor uSBC 0 220, where they are compared with the results of operations performed by the master microprocessor uSBC 0 to detect any possible errors. The uSBCs connect to the Micro Bus 218 over three distinct sets of lines: Address Lines 232, 234, Data Lines 236, 238, and Control Lines 240, 242.

The Micro Bus 218 is a bi-directional bus used by the uSBCs to communicate with the Stations and for data transfer between Stations. It provides access from a uSBC to hardware registers and designators resident on a Station. The Maintenance Clock Control (MTCC) gate array 244 provides maintenance operations such as fault detection, clock distribution and control, and system reset/recovery for all components of the Microsequencer Bus Controller System 200. The MTCC drives a bus enable line, which allows the uSBCs 220, 222, and the Stations to drive data on the Micro Bus 218.

A. uSBC Architecture

Figure 2:
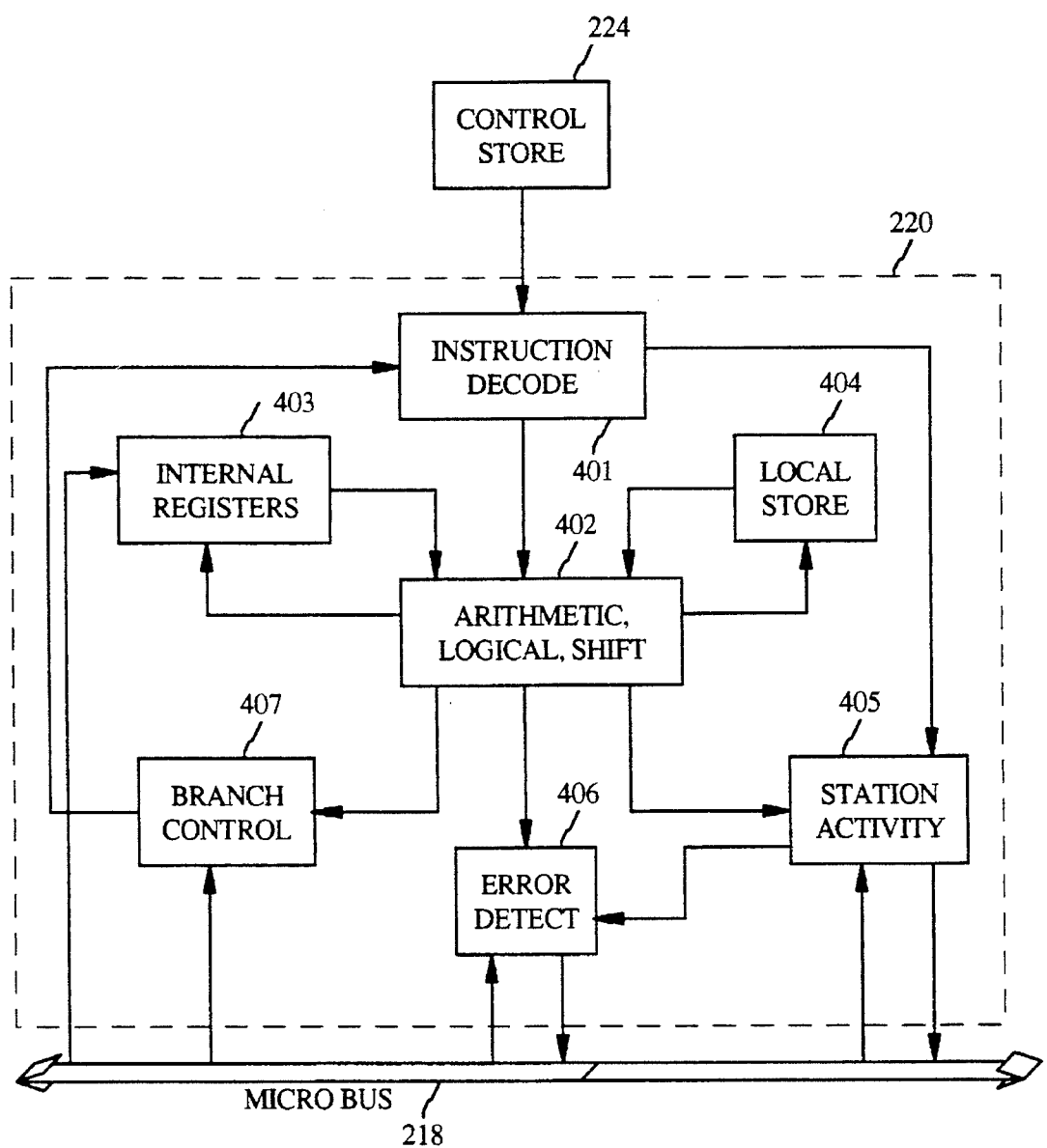
FIG. 2 is a block diagram of the main components of the Microsequencer Bus Controller.

FIG. 2 is a block diagram of the main components of the Microsequencer Bus Controller. The Instruction Decode logic 401 fetches instructions from the Control Store 224 and decodes the instruction to determine which command is requested, what operands the command is to be executed with, and which one of the Stations, if any, operands are to be fetched from or the result is to be written to. The Arithmetic, Logical, and Shift logic 402 performs the requested command by executing arithmetic, logical, or shift operations on the operands. The operands are fetched from one or more Internal Registers 403 or a Local Store memory 404. The result of the command execution is forwarded to Station Activity logic 405, which controls the operation of the Micro Bus 218, and to Error Detect logic 406, which detects any internal or slave microprocessor errors. Finally, Branch Control logic 407 determines the flow of instruction control by examining signals received from Stations over the Micro Bus 218 and the results of the Arithmetic, Logical, and Shift 402 command execution.

Figure 3A:
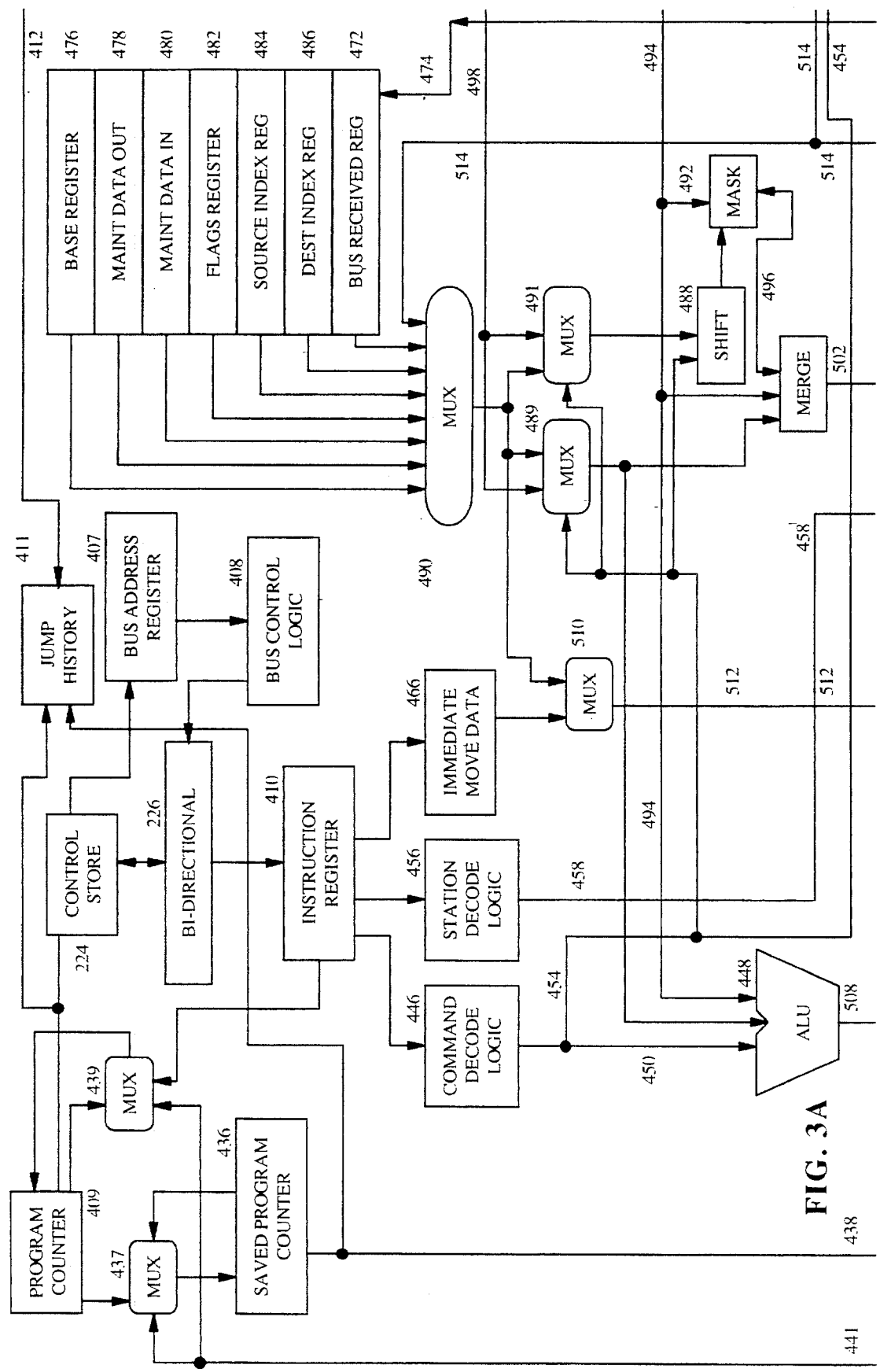
Figure 3B:
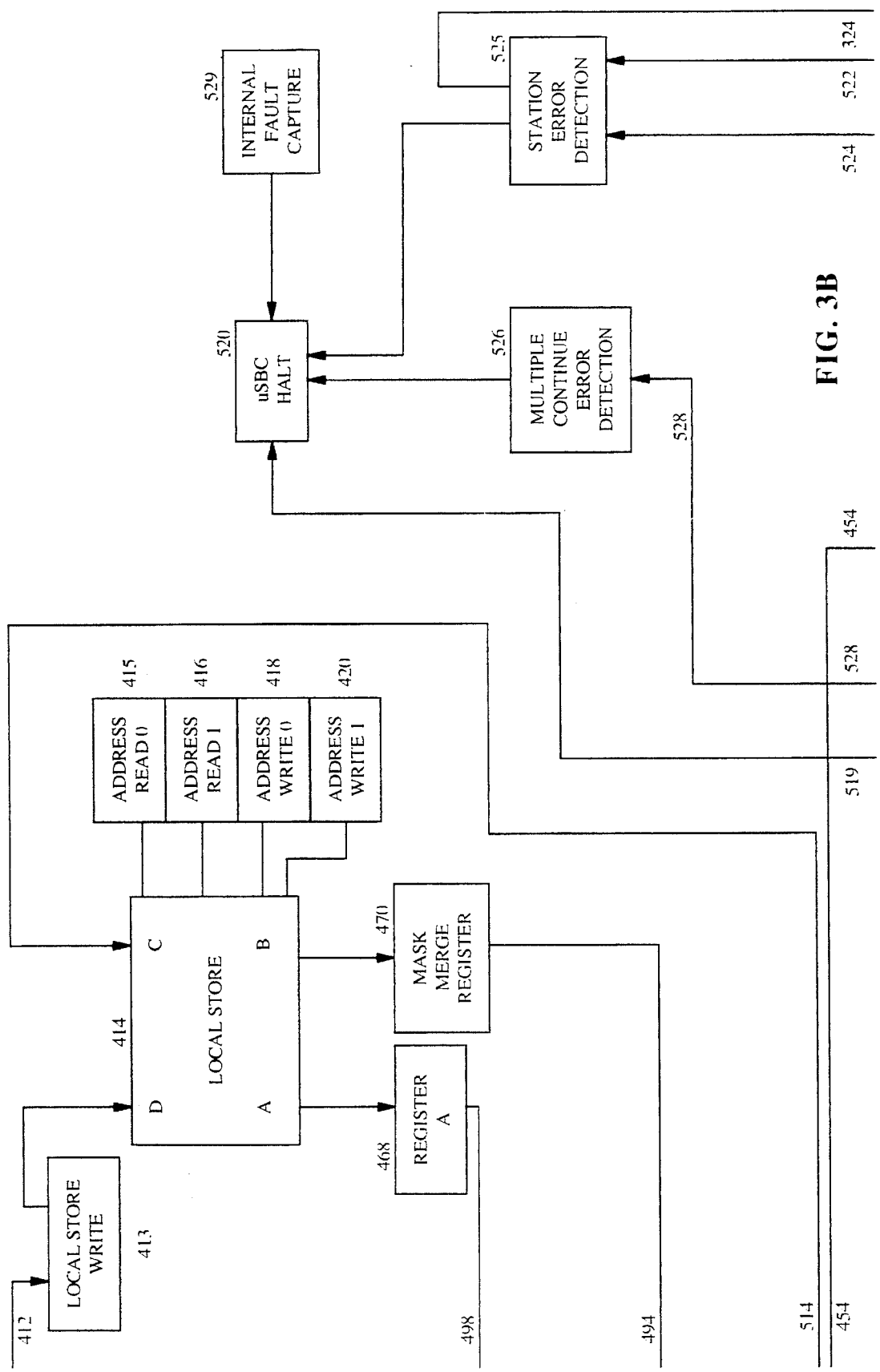
Figure 3C:
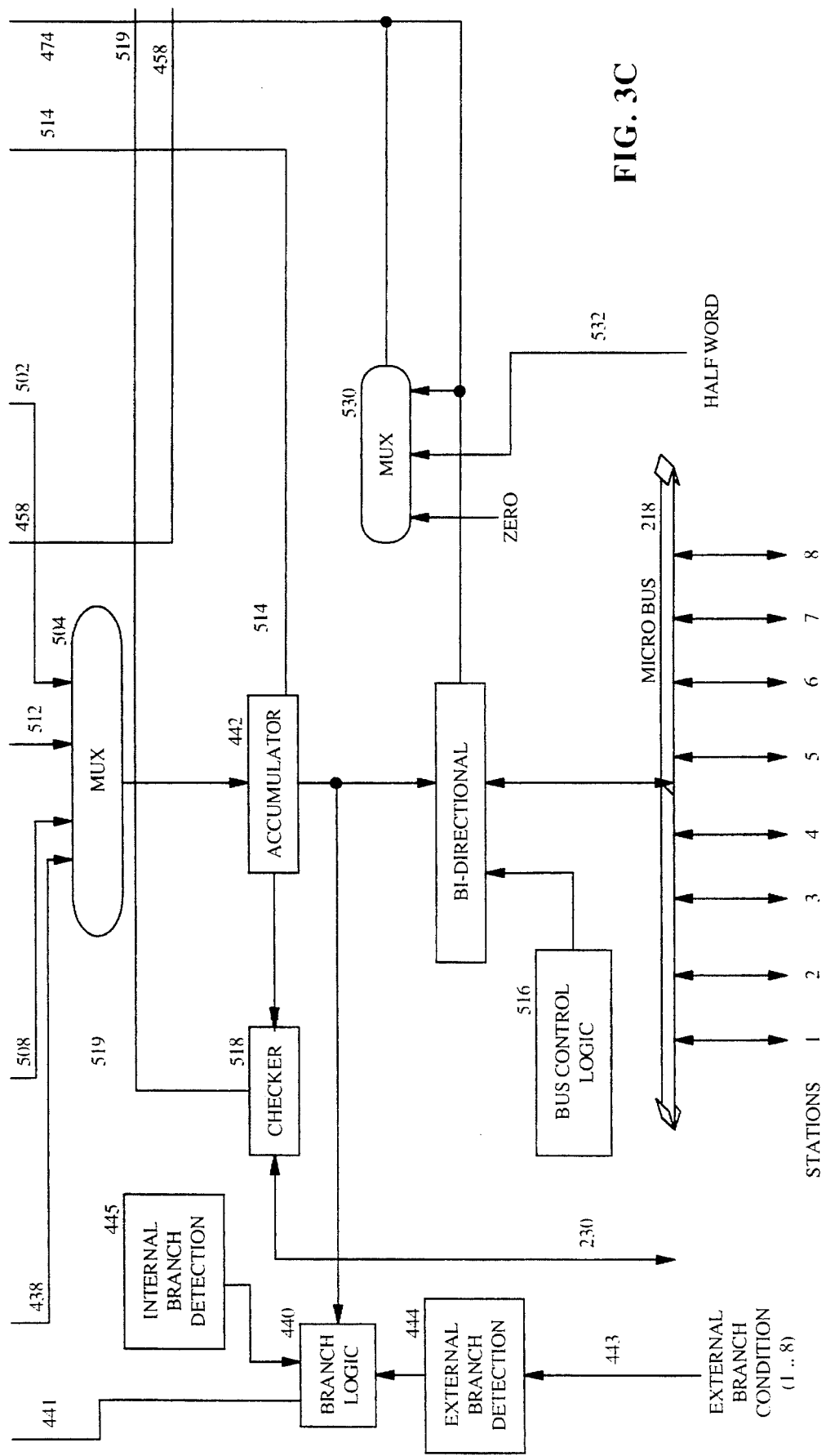

FIG. 3, comprising FIG. 3A through FIG. 3D, is a detailed diagram illustrating the architecture of a Microsequencer Bus Controller. The Control Store 224 holds the instructions to be executed by the uSBC. The Control Store 224 is accessed by the uSBC via Bi-Directional Line 226, which is controlled by Bus Control Logic 408. The Bus Address Register 407 holds the address of the designator specified by the instruction, if any. The Program Counter 409 is a register that holds the address of the instruction to be fetched from the Control Store 224. The instruction is retrieved from the indicated position in the Control Store 224 and stored in the Instruction Register 410 for subsequent processing. For most instructions, the Program Counter 409 is then incremented to address the next instruction in the Control Store to execute. Multiplexor (MUX) 439 controls the input to the Program Counter 409. Input is accepted from the Program Counter itself, the Instruction Register 410, and Branch Logic 440. The address in the Control Store where the instruction was fetched from is saved by the Jump History logic 411 in the Local Store Write Register (LSW0) 413 (see FIG. 3B) over Line 412 and subsequently written to the Local Store 414.

Figure 4:
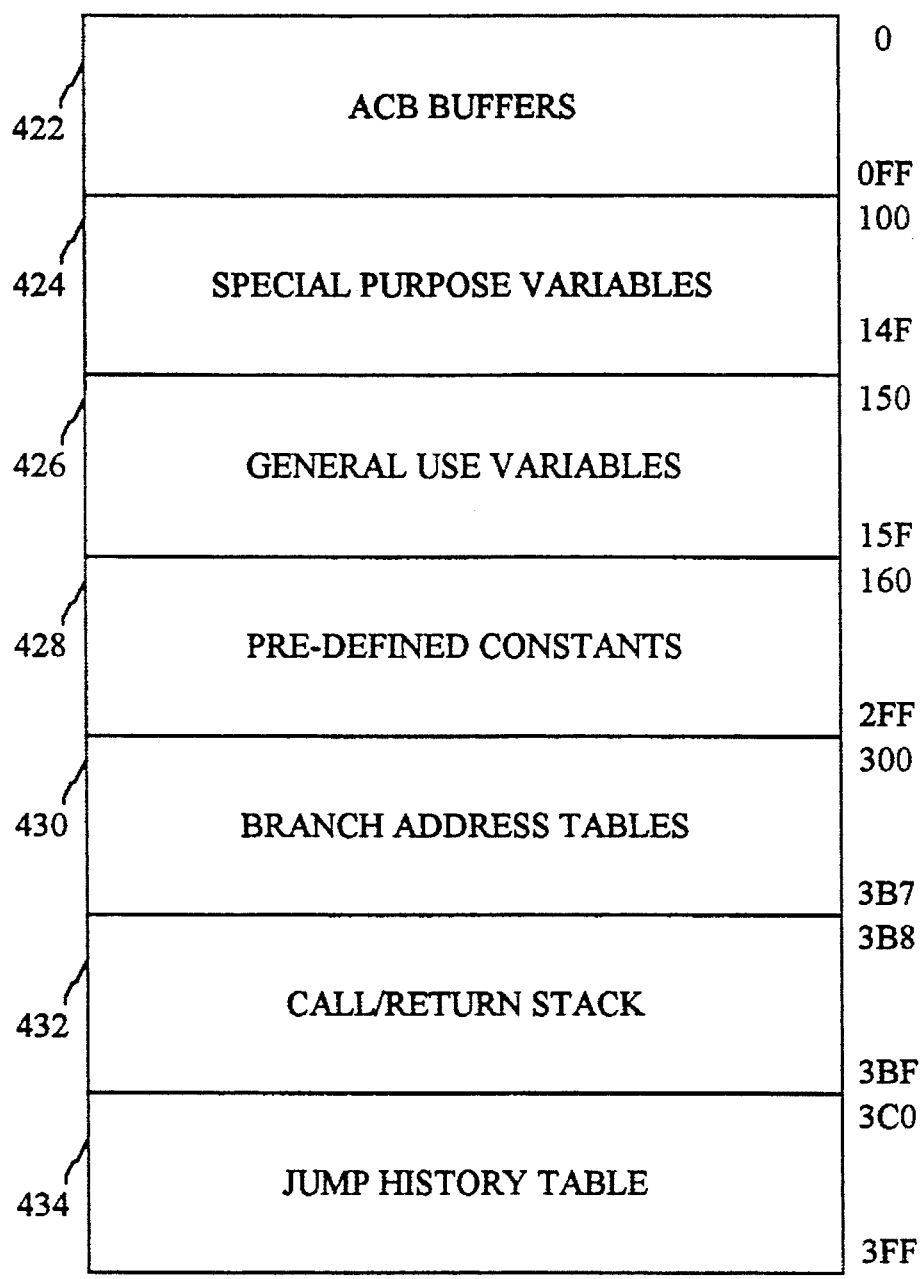
FIG. 4 shows the allocation of the Local Store memory locations.

The Local Store 414 stores data internal to the uSBC for use in executing instructions. The Local Store 414 holds 1024 36-bit words. It is accessed by storing the address to read data from or write data to in one of four special purpose registers. These registers are the Address Read 0 415, Address Read 1 416, Address Write 0 418, and Address Write 1 420. Local store memory locations can be accessed by the Arithmetic Logic Unit (ALU), MOVE, and SHIFT instructions supported by this processor more quickly than references to the uSBC's general registers. This allows the uSBC to process instructions faster than if no Local Store was available. The Local Store 414 is implemented as a four port RAM cell. The four port RAM cell provides the capability of concurrent access to the memory via two read ports and two write ports. FIG. 4 shows the allocation of the Local Store memory locations. Instructions implemented in the preferred embodiment use the Local Store 414 to hold Activity Control Block (ACB) Buffers 422, Special Purpose Variables 424, General Purpose Variables 426, and Pre-Defined Constants 428. The uSBC hardware logic uses the Local Store 414 to hold Branch Address Tables 430, the Call/Return Stack 432 and a Jump History Table 434. The Local Store address domains (from 0 to 3FF overall) of each of these data entries are shown in hexadecimal format in FIG. 4.

Referring back to FIG. 3(A), the Saved Program Counter 436 is a register holding the address in the Control Store 224 where the current microcode instruction to be executed is stored. It is loaded with a value selected by MUX 437 from the current Program Counter 409, the current Saved Program Counter 436, or the output of Branch Logic 440 over Line 441. The Saved Program Counter 436 is also stored in the Local Store 414 by Jump History logic 408. The Jump History Table 434 holds the most recent 64 traced changes in program counter control. The contents of the Saved Program Counter 436 are also forwarded to MUX 504 over Line 438.

When the current instruction is a branch instruction, Branch Logic 440 (see FIG. 3(C)) determines if the branch condition has been satisfied and if it has, then Branch Logic 440 forwards the address of the instruction to be branched to over Line 441 to MUX 439 for subsequent storage in the Program Counter 409. This causes the next instruction fetched to be the instruction stored at the branch address rather than the next sequential instruction. Evaluation of the branch condition includes reading the External Branch Condition signal 443 via External Branch Detection logic 444 if the branch instruction is an External Branch instruction. It includes accepting input from the Internal Branch Detection logic 445 if the branch instruction is an Internal Branch instruction. It also includes accepting input from the Accumulator 442 if the branch instruction is a Table Branch instruction.

The instruction stored in the Instruction Register 410 is processed by two sets of logic. The Command Decode Logic 446 determines what kind of command is indicated by the instruction and forwards data and control information contained in the instruction to the Arithmetic Logic Unit (ALU) 448 over Line 450 and to the Station Activity Control logic 452 (shown on FIG. 3(D)) over Line 454. The Station Decode Logic 456 determines which Station is to be referenced by the instruction, if necessary. The Station identification information obtained by the Station Decode Logic 456 is forwarded over Line 458 to MUX 460. This Station identification information is used to select which Continue signal (1 through 8) 462 (shown on FIG. 3(D)) activation is expected as a result of the execution of the current instruction. The Station Decode Logic 456 also forwards the Station identification information directly to the Station Activity Control logic 452 over Line 464.

The Immediate Move Data register 466 (shown on FIG. 3(A)) holds the data to be transferred to a uSBC internal register, an external register, or to the Local Store 414. The Immediate Move Data 466 is obtained from the instruction stored in the Instruction Register 410.

The uSBC contains various internal registers used during processing of instructions. Operand data for an instruction is read out of the Local Store 414 and stored in general purpose Register A (REGA) 468 (see FIG. 3(B)). A mask/merge bit pattern for manipulating operand data is read out of the Local Store 414 and storm in the Mask/Merge Register (MMRG) 470. The Bus Receive Register (BUSR) 472 (see FIG. 3(A)) is a 36-bit register that holds data, received from the Micro Bus over Line 474, resulting from an external read. It is the only uSBC register that can be written by the Micro Bus 218. During the execution of a operation to read a register on a station external to the uSBC, the resulting data is put into the BUSR 472. It can then be moved to the Local Store 414 or used as an operand for an instruction. The Accumulator (ACC) 442 (see FIG. 3(C)) is a 36-bit register that holds the results of the ALU 448 after execution of an instruction. It is the only register that can output data from the uSBC to the Micro Bus 218. Therefore, every write of an external register or designator uses the ACC 442.

There are six other special purpose registers used by the uSBC. The Local Store Base Register (LSBR) 476 is a six bit register used for Based addressing of the Local Store 414. If Based addressing is selected, the uSBC uses the contents of LSBR 476 as the six most significant bits of the 10-bit Local Store address, and obtains the four least significant bits from the instruction. Instructions use Based addressing to access the ACB Buffers 422 within the Local Store 414. The Maintenance Data Out Register (MDOR) 478 is used to report non-fatal errors. It is a 32-bit dynamic scan/set register connected to the Maintenance processing of the File Cache System 18 via the MTCC 244. The Maintenance Data In Register (MDIR) 480 is a 32-bit dynamic scan/set register under the control of the Maintenance processing of the File Cache System 18 via the MTCC 244. The MDIR is used by Maintenance to send messages to the uSBC.

The Flags Register (FLGR) 482 is a hardware flags register. It contains 16 bits which are individually tested, set, and cleared. Any number of these flags can be set/cleared in one instruction. The flags are also used as branch condition indicators. The Source Index Register (SIXR) 484 and the Destination Index Register (DIXR) 486 are 14-bit registers used for indexing external registers and as internal loop counters. The SIXR 484 is used for indexing read requests from Local Store 414, and DIXR 486 is used for indexing write requests to Local Store 414. These registers can be automatically incremented as part of the execution of many instructions. Thus they are useful and efficient loop counters.

The uSBC contains two main processing groups of logic. The Shift/Mask/Merge unit performs all shift operations, as well as masking and merging of operands. Shift logic 488 selects the contents of one of the registers described above as input data via MUX 490 and MUX 491 as shown. Control of the shift, such as shift direction and length, is obtained from the Command Decode logic 446. The results of the Shift operation are forwarded to Mask logic 492. The Mask logic 492 also obtains input data representing a mask bit pattern from the MMRG register 470 over Line 494. Results of the Mask logic 492 are forwarded to Merge logic 496. Merge logic 496 also accepts input data representing an address in the Local Store 414 from REGA 468 over Line 498 or from one of the internal registers multiplexed by MUX 489. Merge logic 496 obtains a merge bit pattern from the MMRG register 470 over Line 494. The results of the Shift/Mask/Merge operation are forwarded via Line 502 and MUX 504 to the Accumulator 442.

The ALU 448 performs all arithmetic and logical operations. It processes either 32-bit or 36-bit data words, depending on the whether the uSBC is operating 32-bit or 36-bit mode. The ALU 448 selects operand data from one of the internal registers and REGA 468 via MUX 489, or MMRG 470 over Line 494. It also obtains command information from the Command Decode Logic 446 via Line 450. The result of the arithmetic or logical operation is stored in the Accumulator 442 (see FIG. 3(C)) via MUX 504 and Line 508.

The Accumulator 442 selects data to store via MUX 504 from four possible sources. The first source is the Saved Program Counter 436 which forwards data over Line 438. The data from the Saved Program Counter 436 represents the address of the instruction being executed. The second source is the output from the ALU 448 over Line 508. The third source is MUX 510 which forwards Immediate Move Data from an instruction or data from one of the internal registers over Line 512. The fourth source is the output from the Shift/Mask/Merge logic grouping over Line 502.

The contents of the Accumulator 442 may be selected by MUX 490 as an operand for the execution of a subsequent instruction via Line 514. The contents of the Accumulator 442 are also stored in the Local Store 414 via Line 514. The contents of the Accumulator 442 may also be written to a register on a Station connected to the Micro Bus 218. Bus Control Logic 516 controls transfers over the bi-directional Micro Bus 218.

If the uSBC is a slave uSBC, then the contents of the Accumulator 442 are forwarded over Line 230 to the master uSBC for comparison with the result stored in the master uSBC's Accumulator. Checker logic 518 compares the two values and indicates a fatal error to the uSBC Halt logic 520 (see FIG. 3(B)) if the two values are not equal. The uSBC Halt logic 520 then stops the microprocessor. Processing is also halted if an error indication is received from one of the Stations via a Station Error 522 or Station Abort 524 signal. These signals are processed by Station Error Detection logic 525 and a error indication is forwarded to uSBC Halt logic 520. A Lock Bus signal 324 is then sent out to notify the other Stations that there is a problem. Multiple Continue Error Detection logic 526 detects errors relating to multiple Continue signals being received by the uSBC from MUX 460 over Line 528. If such an error occurs, the uSBC Halt logic 520 stops the microprocessor. Finally, if an internal fault occurs, Internal Fault Capture logic 529 detects the error and notifies the uSBC Halt logic 520.

Dam may be received over the Micro Bus 218 in either full-word or half-word modes. In full-word mode, the data consists of either 32 or 36 bits, depending on the mode setting of the uSBC. In half-word mode, the data consists of either 16 or 18 bits, again depending on the mode setting of the uSBC. The data received over the Micro Bus 218 is stored in the Bus Received Register 472 after being selected by MUX 530 depending on the setting of the Half Word signal 532. If the Half Word signal is present, then the lower half of the bits in the data sent to the Bus Received Register 472 is zeroed out.

The uSBC informs the Stations that it is transmitting dam over the Micro Bus 218 by manipulating the Bus Busy lines 534. Bus Busy Logic 536 accepts as input command information from the Command Decode Logic 446 over Line 454 and Station identification information from the Station Decode Logic 456 over Line 458. The Bus Busy Logic 536 sets the corresponding Bus Busy line to high when the uSBC is transferring data from the Accumulator 442 over the Micro Bus 218 to that particular Station.

High level functional control of the Micro Bus 218 is managed by the Station Activity Control logic 452. Station Activity Control 452 implements the uSBC/Station communication protocol by setting and clearing the eight Source signals 540, the Data Destinate signal 308, four of the eight Branch On External Condition signals 320, the Latch Set signal 312, and the Latch Clear signal 316. Bus Wait Logic 548 ensures that Station Activity Control 452 does not attempt to access the Micro Bus 218 if it is not available for data transfers.

B. Table Branch Instruction

The Table Branch instruction is used to transfer instruction flow control in the uSBC. The Table Branch instruction is different from ordinary branch instructions in that it uses a dynamic input from a register as the index into a Branch Table located in the Local Store to obtain the address where control of the uSBC is to be transferred, if the branch condition is met. The implementation of this instruction is much more than simply setting up a hard-coded "jump" table. The program executing in the uSBC can change the values in the Branch Address Table during run-time, thus the branching capability for the uSBC is flexible and not pre-determined at assembly or system initialization time. In addition, multiple tables are supported through the use of a based addressing scheme. The selection of an entry in the Branch Table is accomplished by merging a program-specified index with the base address of the specified Branch Address Table. This approach to indexing provides the program with a fast and flexible way to access more branch addresses than by using a direct index into a hard-coded table.

Figure 5:
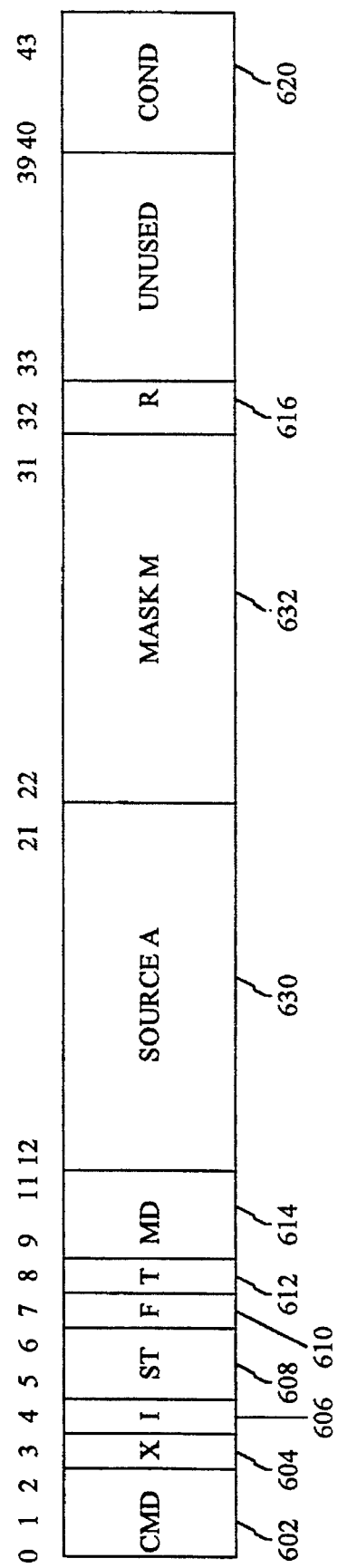
FIG. 5 shows the format of a Table Branch instruction.

FIG. 5 shows the format of the Table Branch instruction. The Table Branch instruction is one of the instructions in the uSBC instruction set. The Command (CMD) field (bits 0–2) 602, when equal to six, specifies that this is a branch instruction. The X field (bit 3) 604, when set, indicates that the indexed addressing mode is selected. The I field (bit 4) 606, when set, causes the SIXR 484 to be incremented by one after all data references for this instruction are complete. The ST field (bits 5–6) 608 controls the Call/Return Stack 432 during a branch instruction. If the ST field 608 is one and the branch condition is evaluated as true, then processing of this instruction includes popping an address off the Call/Return Stack 432. If the ST field 608 is two and the branch condition is evaluated as true, then processing of this instruction includes resetting the Call/Return Stack 432. If the ST field 608 is three, then no entry is made in the Jump History Table 434.

The F field 610 indicates whether the branch will take place on a true value (F=0) or a false value (F=1). The MD field 614 (bits 9–11) specifies the mode of operation for the branch instruction. The mode may be internal (when MD=0) or external (when MD=4). The mode is always internal for the Table Branch. The R field (bit 32) 616 selects either BUSR 472 (when R=0) or ACC 442 (when R=1) as an input register for this instruction. If the branch is internal, the COND field (bits 40–43) 620 indicates the condition upon which the branch will take place. If the instruction is a Table Branch (when the T field 612 is set), the Source A field (bits 12–21) 630 indicates an address in the Local Store 414 from which a Base Address (BADR) of one of the Branch Tables will be fetched and merged with the data stored in either BUSR 472 or ACC 442. The Merge logic 496 uses the Mask/Merge control word stored at the Local Store address specified by the Mask M field (bits 22–31) 632. The Mask M field is the index into the selected Branch Table. The number of bits in the Mask M field reflects the maximum number of entries in the selected Branch Table. Since there are 10 bits allocated for this field, the maximum number of branch addresses is 2**10, or 1024 addresses. The maximum number of Branch Tables is dependent only on the size of the Local Store. The result of mask/merge computation is the address in the Local Store 414 which contains the address in the Control Store 224 where program control is to be branched, if the branch condition is satisfied.

Figure 6:
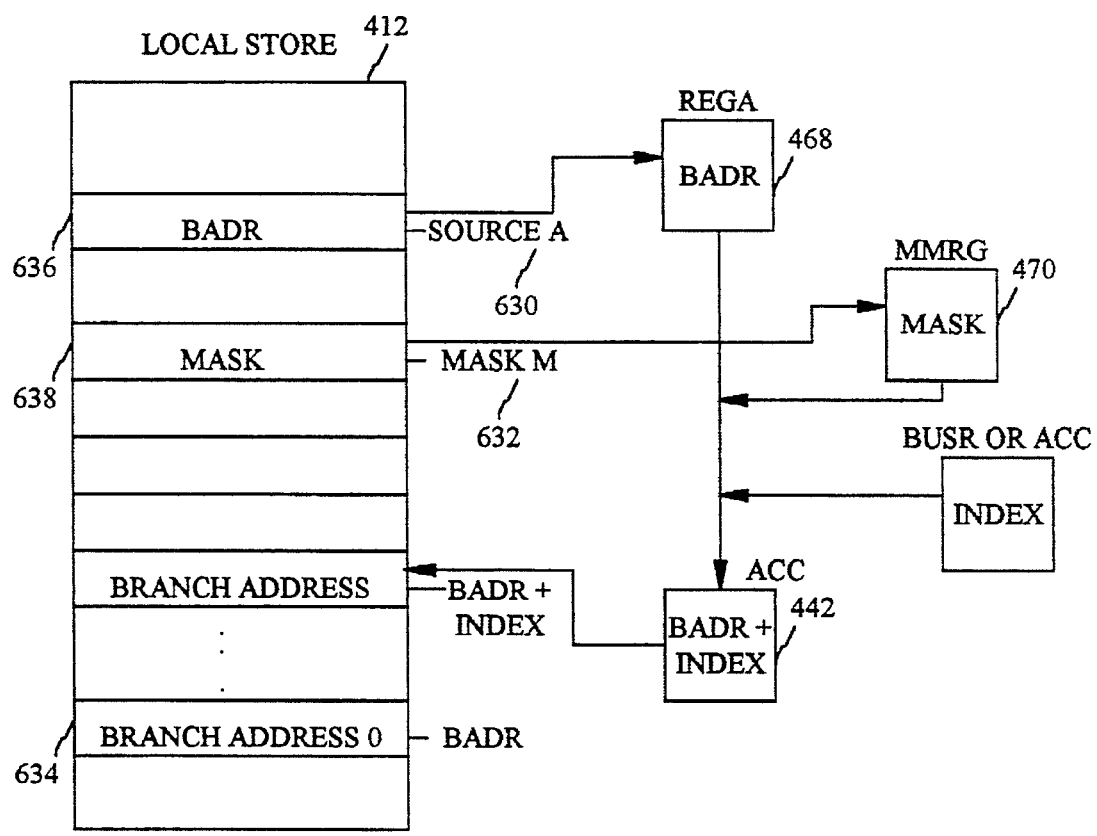
FIG. 6 is a block diagram illustrating the relationships between the Local Store and internal registers in executing the Table Branch instruction.

FIG. 6 is a block diagram illustrating the relationships between the Local Store and the internal registers used in executing the Table Branch instruction. The Local Store 414 contains Branch Address Tables 430 which hold addresses of microcode instructions in the Control Store 224. The addresses are stored in the Local Store 414 starting at a Base Address (BADR) 634. The contents of the memory location at BADR 634 is Branch Address 0 of that Branch Address Table. The value BADR is initially stored at system initialization time in the Local Store 414 at a memory location 636 subsequently pointed to by the Source A field 630 of the Table Branch instruction. Similarly, the value of the Mask was stored at the memory location 638 pointed to by the Mask M field 632 of the Table Branch instruction. The Base Address and the Mask value in the Local Store may be changed at any time by the execution of an instruction that stores new data into those entries in the Local Store.

Figure 7:
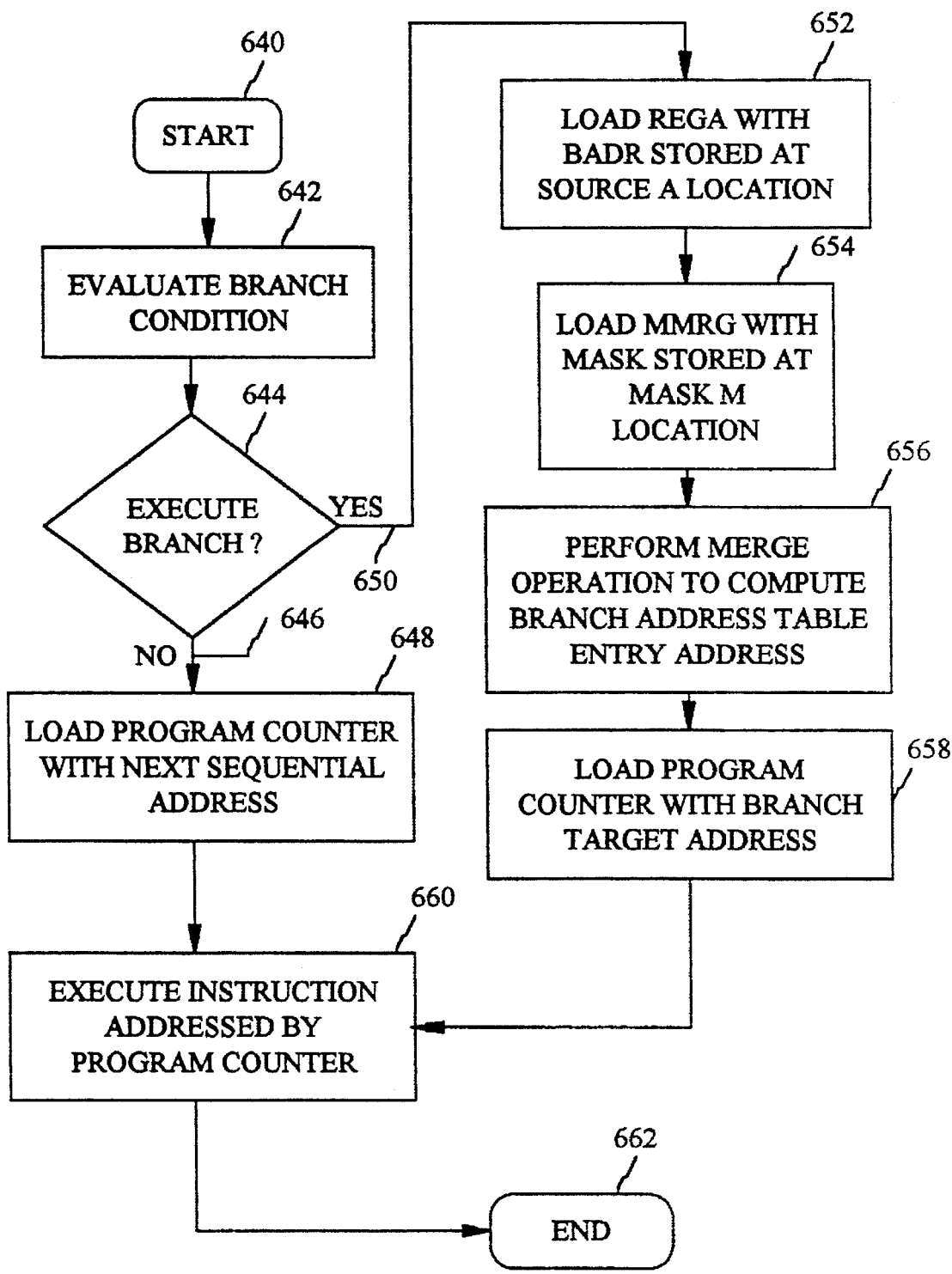
FIG. 7 is a flow chart describing the steps performed during the execution of the Table Branch instruction.

FIG. 7 is a flow chart describing the steps performed during the execution of the Table Branch instruction. From the Start Step 640, the uSBC evaluates the branch condition 642. If the branch is not to be taken at Step 644, then the No path 646 is taken and the uSBC at Step 648 loads the Program Counter with the next sequential address in the Control Store 224.

If the branch is to be taken at Step 644, the Yes path 650 is taken and the uSBC performs Step 652 by loading Register A (REGA) 468 with the Base Address (BADR) of a Branch Address Table stored at the Source A 630 location 636. The BADR is obtained from a field in the branch instruction. Next, Step 654 is performed to load the Mask/Merge Register (MMRG) 470 with the Mask stored at the Mask M 632 location 638. A mask/merge operation is then performed at Step 656 to compute BADR and Index according to the Mask value, where Index is a table index value obtained from either the Bus Received Register (BUSR) 472 or the Accumulator (ACC) 442. Either BUSR 472 or ACC 442 is loaded with the Index value at the completion of the instruction immediately preceding the Table Branch instruction. The branch instruction selects which register is providing the input value. The mask/merge operation is fully described in a related application, docket number RA-3283, entitled "System For Processing Shift, Mask, and Merge Operations In One Instruction." The resulting value of the mask/merge operation is loaded into ACC 442 and indicates the address of an entry in the Branch Address Table 430 stored in Local Store 414. The contents of the entry is a Branch Target Address, that is, a location in the Control Store where program control should be transferred to. The Branch Target Address is read out of the Branch Address Table location, loaded into the ACC 442, and loaded into the Program Counter over Line 441 at Step 658. Program control is then transferred to either the Branch Target Address if the branch is to be taken or the next sequential address if the branch is not to be taken. The instruction addressed by the Program Counter is executed at Step 660. Table Branch instruction processing ends at Step 662.

One skilled in the art can readily see that the size, location, and number of Branch Address Tables may be changed during execution time by program control because they are stored in a RAM local store. The tables need not be fixed at assembly or initialization time and remain so throughout the operational life of the system. Instead, the contents of the tables (i.e., the Branch Target Addresses) may be changed at any time. The programmer has control over what address to select for branching purposes via the loading of the Base Address into the REGA 468 register. In addition, manipulation of the Index value in the BUSR or ACC register may be performed to efficiently loop through a series of branches whose branch addresses are kept in the Branch Address Table. This use of based addressing greatly expands the possible choices for the branch target address. In addition, because the base address is masked, it allows for different Branch Address Table sizes.

Since the Branch Address Table is in the Local Store, it may be easily and quickly accessed. As a result, execution time of the Table Branch instruction in the preferred embodiment is less than for alternative methods of branching. For example, if a Branch Address Table contains 16 branch addresses, a four bit value could be used to adequately select a branch address. If a Table Branch Instruction is not used, to select any given branch address, the following steps must be performed. A shift and test operation would be performed for each of the four selector bits. The time to shift one bit is 100 nanoseconds (ns). The time to test a bit for a possible branch is 100 ns if the branch is taken, 200 ns if the branch is not taken. This time may be averaged as 150 ns per bit. The jump itself takes 200 ns. Thus the total time would be 1200 ns for a 16-way branch. However, with the Table Branch Instruction, this time is reduced to 350 ns. The time saved gets larger as the size of the Branch Address Table is increased. If 64 addresses were considered at a time, then a six bit value would be needed to select among the addresses. The corresponding total time would be 1700 ns. But the time used by the Table Branch Instruction remains 350 ns. Because of the expanded number of Branch Target Addresses available shown here, a branch can be taken by the processor to more possible target addresses in less time than before.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A microsequencer bus controller for executing branch program instructions fetched from a read-only-memory control store comprising:

a random-access-memory local store, said random-access-memory local store including:

one or more branch address tables, each of said branch address tables including a plurality of branch target addresses pointing to instructions in the read-only-memory control store, wherein the size, location, and contents of said branch address tables may be changed by the execution of instructions fetched from the read-only-memory control store;

a base address table, wherein said base address table has one or more entries, each one of said entries corresponding to one of said branch address tables, each one of said entries containing a base address of one of said branch address tables; and a mask/merge table, wherein said mask/merge table has one or more mask/merge entries, each one of said mask/merge entries containing a plurality of mask/merge flags;

instruction decode means, coupled to the read-only-memory control store, for determining if an instruction fetched from the read-only-memory control store is a branch program instruction, and for extracting parameters specified by said branch program instruction, said parameters including a base pointer addressing one of said entries in said base address table and a mask/merge pointer addressing one of said mask/merge entries in said mask/merge table;

a base address register to store said base address fetched from said entry in said base address table addressed by said base pointer;

a mask/merge register to store said mask/merge flags fetched from said mask/merge entry in said mask/merge table addressed by said mask/merge pointer;

an index register for receiving an index resulting from the execution of the previous instruction;

mask logic, coupled to said instruction decode means, said base address register, and said mask/merge register, for masking selected bit pairs of said base address register according to the even-numbered bits of said mask/merge register to produce an intermediate indicator;

merge logic, coupled to said mask logic, said index register, and said mask/merge register, for merging selected bit pairs of said intermediate indicator with selected bits of said index register according to the odd-numbered bits of said mask/merge register to produce an indicator into said selected branch address table where a selected branch target address is stored; and branch control logic, coupled to said merge logic, and said instruction decode means, for conditionally selecting the instruction addressed by either a next sequential address or said selected branch target address pointed to by said indicator as a next instruction to be fetched from the read-only-memory control store.

2. A method of transferring program control in a processor by executing a conditional branch program instruction fetched from a read-only-memory control store addressed by a program counter, the conditional branch program instruction having fields for storing a base pointer and a mask/merge pointer, the processor having loaded a register with an index during execution of the immediately preceding program instruction, the processor including a base address table for storing base addresses, a base register for holding a selected base address, a mask/merge table for storing a plurality of mask/merge flags, a mask/merge register for holding a selected plurality of mask/merge flags, and a plurality of branch address tables for storing branch target addresses, the base address table, mask/merge table and branch address tables being able to be modified by the processor executing program instructions programmed by a computer programmer, comprising the steps of:

(a) determining if an instruction fetched from the read-only-memory control store is a conditional branch program instruction;

(b) evaluating a branch condition specified by the instruction, when the instruction is a conditional branch program instruction;

(c) selecting whether or not a branch is to be taken depending on the branch condition evaluation;

(d) incrementing the program counter to address a next sequential instruction when the branch is not to be taken;

(e) performing the following steps when the branch is to be taken:

(e1) extracting the base pointer and the mask/merge pointer from the conditional branch program instruction, the base pointer addressing an entry in the base address table, the mask/merge pointer addressing a mask/merge entry in the mask/merge table;

(e2) loading the base register with a base address of a branch address table containing branch target addresses, said base address being fetched from said entry in the base address table addressed by said base pointer;

(e3) loading the mask/merge register with a plurality of mask/merge flags, said mask/merge flags being fetched from said mask/merge entry in the mask/merge table addressed by the mask/merge pointer;

(e4) masking selected bits of said base address according to the even-numbered bits of said mask/merge flags to produce an intermediate indicator;

(e5) merging selected bits of said intermediate indicator with selected bits of the index according to the odd-numbered bits of said mask/merge flags to produce an address of a branch address entry into said branch address table; and (e6) loading the program counter with a branch target address from said branch address entry into said branch address table.

* * * * *